US009485081B2

(12) United States Patent
Ahn et al.

(10) Patent No.: US 9,485,081 B2
(45) Date of Patent: Nov. 1, 2016

(54) APPARATUS FOR COMPENSATING FOR SKEW BETWEEN DATA SIGNALS AND CLOCK SIGNAL

(71) Applicant: Samsung Display Co., Ltd., Yongin, Gyeonggi-Do (KR)

(72) Inventors: Hee-Sun Ahn, Yongin (KR); Jae-Goo Lee, Yongin (KR); Choong-Sun Shin, Yongin (KR); Young-Uk Won, Yongin (KR); In-Bok Song, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 304 days.

(21) Appl. No.: 14/207,447

(22) Filed: Mar. 12, 2014

(65) Prior Publication Data

US 2014/0269782 A1 Sep. 18, 2014

(30) Foreign Application Priority Data

Mar. 14, 2013 (KR) .................. 10-2013-0027562

(51) Int. Cl.
*H04L 7/00* (2006.01)
*H04L 25/14* (2006.01)

(52) U.S. Cl.
CPC ............ *H04L 7/0016* (2013.01); *H04L 25/14* (2013.01); *H04L 7/0008* (2013.01)

(58) Field of Classification Search
CPC .... H04L 7/0008; H04L 7/0016; H04L 25/14
USPC .......................... 711/167; 713/401; 714/700; 327/149–156; 375/359–371, 110, 118, 375/119, 120; 358/150; 307/597, 602, 603
See application file for complete search history.

(56) References Cited

U.S. PATENT DOCUMENTS

| 6,157,229 A * | 12/2000 | Yoshikawa ............... H03L 7/07 327/147 |
| 7,159,092 B2 * | 1/2007 | Johnson ............... G06F 13/1689 711/167 |
| 2002/0087922 A1 * | 7/2002 | Glenn ................... H04L 7/0037 714/700 |
| 2004/0125902 A1 * | 7/2004 | Nishimura ............ H03K 5/082 375/371 |
| 2004/0223570 A1 * | 11/2004 | Adkisson .................. G06F 1/12 375/359 |
| 2004/0246786 A1 * | 12/2004 | Vogt ......................... G11C 7/10 365/199 |
| 2005/0114724 A1 * | 5/2005 | Wu .......................... G06F 1/10 713/401 |

(Continued)

FOREIGN PATENT DOCUMENTS

| KR | 10-2005-0061892 A | 6/2005 |
| KR | 10-2007-0121465 A | 12/2007 |

(Continued)

Primary Examiner — Thai Hoang
(74) Attorney, Agent, or Firm — Lewis Roca Rothgerber Christie LLP

(57) ABSTRACT

An apparatus for compensating for a skew is provided between data signals supplied through a plurality of data lines and a clock signal supplied through a clock line. A skew compensation apparatus includes a plurality of data receivers each configured to delay a data signal supplied through a corresponding data line based on associated phase difference data and to output the delayed data signal, a clock receiver configured to receive a clock signal supplied through a clock line, and a phase controller configured to select any one of the plurality of data receivers and to output, to the selected data receiver, a phase control signal configured to correct the phase difference data of the selected data receiver based on the phase difference between a data signal output from the selected data receiver and the clock signal.

12 Claims, 3 Drawing Sheets

(56) References Cited

U.S. PATENT DOCUMENTS

| | | | |
|---|---|---|---|
| 2006/0103439 A1* | 5/2006 | Roth | G06F 5/08 327/156 |
| 2007/0297552 A1* | 12/2007 | Bae | H03K 19/0966 375/371 |
| 2011/0156936 A1 | 6/2011 | Kim et al. | |
| 2012/0249565 A1* | 10/2012 | Ishii | G09G 5/006 345/531 |

FOREIGN PATENT DOCUMENTS

| | | |
|---|---|---|
| KR | 10-2011-0078471 A | 7/2011 |
| KR | 10-2011-0094839 A | 8/2011 |

\* cited by examiner

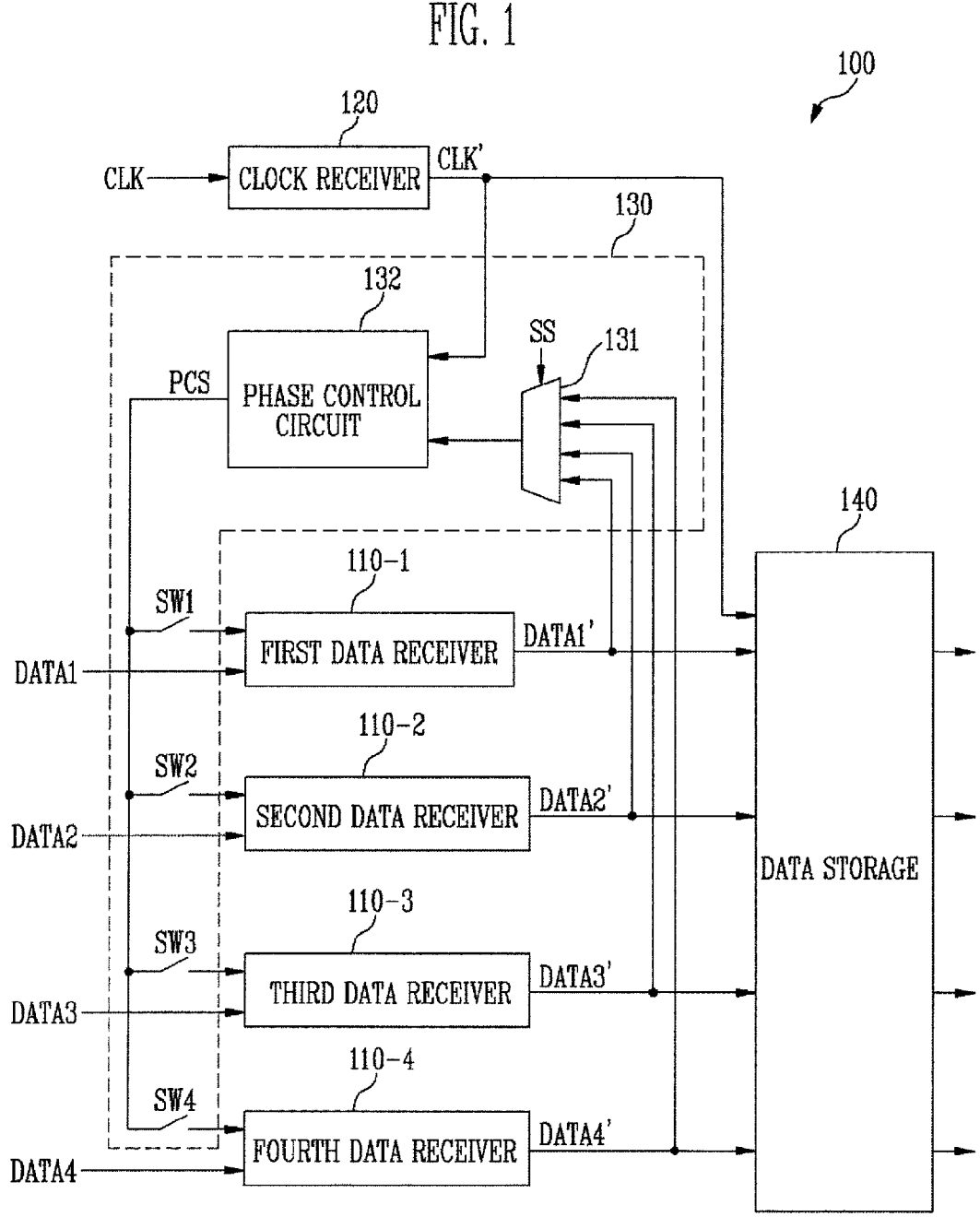

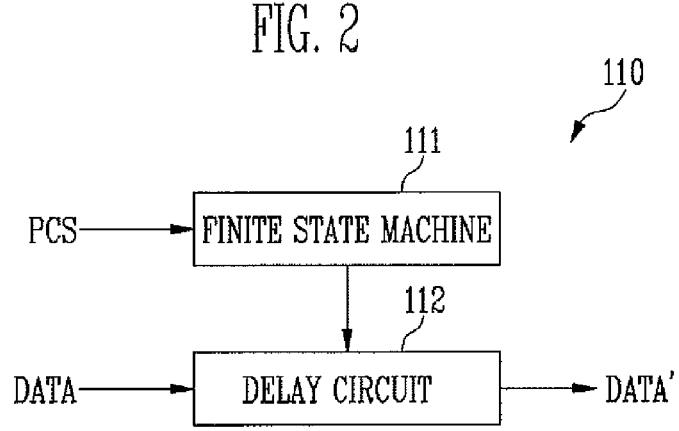
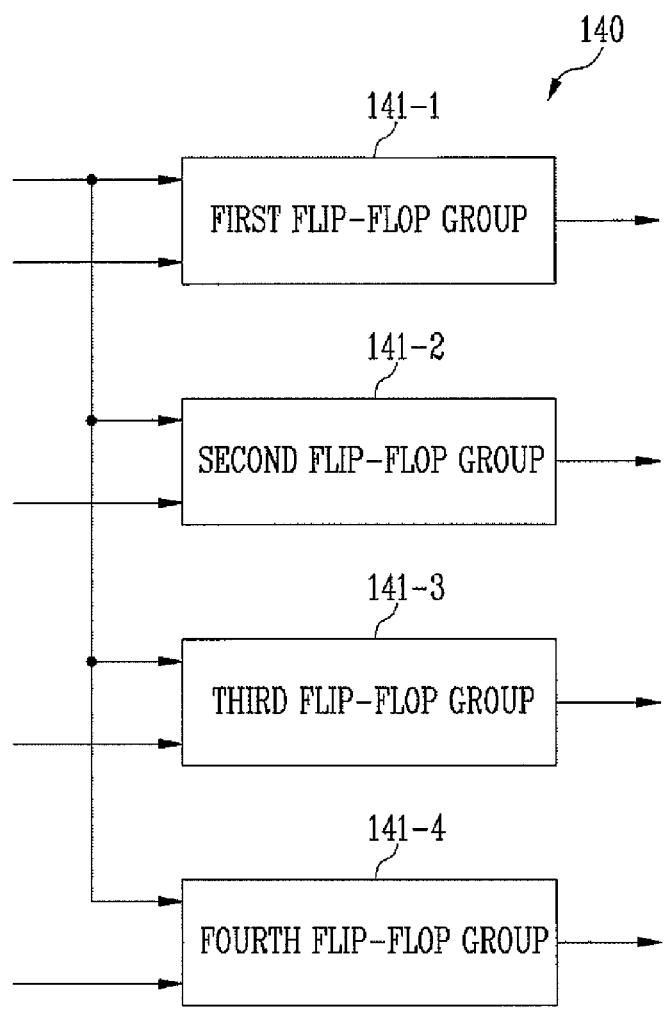

APPARATUS FOR COMPENSATING FOR SKEW BETWEEN DATA SIGNALS AND CLOCK SIGNAL

CROSS-REFERENCE TO RELATED APPLICATION

This application claims priority to and the benefit of Korean Patent Application No. 10-2013-0027562, filed on Mar. 14, 2013, in the Korean Intellectual Property Office, the content of which is incorporated herein by reference in its entirety.

BACKGROUND

1. Field

An embodiment of the present invention relates to an apparatus for compensating for a skew between data signals supplied through a plurality of data lines and a clock signal supplied through a clock line.

2. Description of the Related Art

As the data processing speed of semiconductor devices, e.g., a processor and peripheral devices, is increased, the data transmission speed between the semiconductor devices is also increased. In case of a mobile device, the charge capacity of a built-in battery is limited, and therefore, the communication between semiconductor devices used in the mobile terminal should have fast data transmission speeds and low power consumption. Recently, a Mobile Industry Processor Interface® (MIPI®) has come into the spotlight as an interface of the mobile device.

SUMMARY

Aspects of the embodiments of the present invention are directed toward a skew compensation apparatus capable of controlling a phase difference between data signals supplied through a plurality of data lines and a clock signal supplied through a clock line.

A skew compensation apparatus, according to an embodiment of the present invention, includes: a plurality of data receivers each delaying a data signal supplied through a corresponding data line according to associated phase difference data and outputting the delayed data signal; a clock receiver receiving a clock signal supplied through a clock line; and a phase controller selecting any one of the plurality of data receivers and outputting, to the selected data receiver, a phase control signal for correcting the phase difference data of the selected data receiver according to the phase difference between a data signal output from the selected data receiver and the clock signal.

The phase controller may correct the phase difference data of each of the plurality of data receivers by sequentially selecting the plurality of data receivers.

Each data receiver may include a finite state machine correcting and storing the phase difference data in response to the phase control signal; and a delay circuit delaying the data signal supplied through the corresponding data line, based on the phase difference data stored in the finite state machine, and outputting the delayed data signal.

The clock receiver may delay the clock signal supplied through the clock line for a certain time and output the delayed clock signal.

The phase controller may output the phase control signal, so that the phase difference between the clock signal output from the clock receiver and the data signal output from the selected data receiver becomes 90 degrees.

The phase controller may include a multiplexer outputting a data signal output from the selected data receiver, selected from among the data signals output from the plurality of data receivers, in response to a selection signal; a phase control circuit outputting the phase control signal according to the phase difference between the clock signal and the data signal output from the multiplexer; and a plurality of switches coupling the phase control circuit to the selected data receiver.

The selection signal may be output from the phase control circuit.

The plurality of switches may be controlled by the phase control circuit.

The skew compensation apparatus may further include a data storage storing the data signals output from the plurality of data receivers, in response to the clock signal.

The data storage may include a plurality of flip-flop groups each storing one of the data signals output from the plurality of data receivers, in response to the clock signal.

The data signals supplied to the plurality of data receivers may be configured with data packets and a blank section between the data packets.

The phase controller may output, to the selected data receiver, the phase control signal generated, based on the phase difference between a null packet supplied during the blank section and the clock signal.

In the skew compensation apparatus, according to embodiments of the present invention, it is possible to compensate for a skew between data signals supplied through a plurality of data lines and a clock signal supplied through a clock line.

The skew compensation apparatus may compensate for a skew, using a blank section between data packets when a semiconductor device including the skew compensation apparatus is produced (e.g. prior to being used in a consumer application), thereby reducing power consumption.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration. It will be understood that when an element is referred to as being "between" two elements, it may be the only element between the two elements, or one or more intervening elements may also be present. Like reference numerals refer to like elements throughout.

FIG. 1 is a block diagram illustrating a skew compensation apparatus, according to an example embodiment of the present invention.

FIG. 2 is a block diagram illustrating in detail each data receiver shown in FIG. 1, according to an example embodiment of the present invention.

FIG. 3 is a block diagram illustrating in detail a data storage shown in FIG. 1, according to an example embodiment of the present invention.

DETAILED DESCRIPTION

Figure 4:
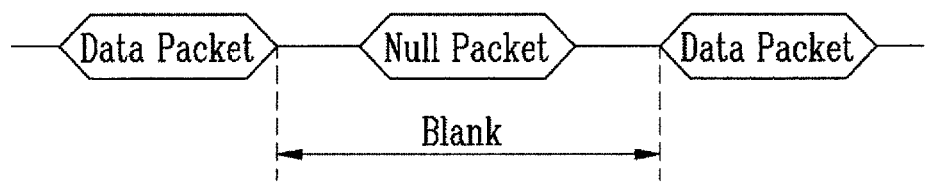
FIG. 4 is a timing diagram illustrating an operation of the skew compensation apparatus shown in FIG. 1, according to an example embodiment of the present invention.

FIG. 1 is a block diagram illustrating a skew compensation apparatus according to an embodiment of the present invention. FIG. 2 is a block diagram illustrating in detail each data receiver shown in FIG. 1, according to an example embodiment of the present invention. FIG. 3 is a block diagram illustrating in detail a data storage shown in FIG. 1, according to an example embodiment of the present invention.

In FIG. 2, for convenience of illustration, a plurality of data receivers 110-1 to 110-4 are generally designated by reference numeral 110, and data signals DATA1 to DATA4 respectively supplied to the plurality of data receivers 110-1 to 110-4 are generally designated by reference numeral DATA. Data signals DATA1' to DATA4' respectively supplied from the plurality of data receivers 110-1 to 110-4 are generally designated by reference numeral DATA'.

Referring to FIGS. 1 to 3, the skew compensation apparatus 100 includes a plurality of data receivers 110-1 to 110-4, a clock receiver 120, a phase controller 130 and a data storage 140.

Although four data receivers 110-1 to 110-4 are shown in FIG. 1, the scope of the embodiment of the present invention is not limited thereto.

Each of the plurality of data receivers 110-1 to 110-4 delays data signals DATA1 to DATA4 supplied through a corresponding line among a plurality of data lines according to a phase difference data thereof, and outputs the delayed data signals DATA1' to DATA4'.

The delayed data signals DATA1' to DATA4' are supplied to the phase controller 130 and the data storage 140.

For example, a first data receiver 110-1 delays a first data signal DATA1 supplied through a first data line according to the phase difference data thereof, and outputs the delayed data signal DATA1' to the phase controller 130 and the data storage 140.

Each of the plurality of data receivers 110-1 to 110-4 includes a finite state machine 111 and a delay circuit 112.

The finite state machine 111 corrects and stores a phase difference data in response to a phase control signal PCS output from the phase controller 130.

The delay circuit 112 delays a data signal DATA supplied through a corresponding data line, based on the phase difference data stored in the finite state machine 111, and outputs the delayed data signal DATA'.

The clock receiver 120 receives a clock signal CLK supplied through a clock line. According to an embodiment, the clock receiver 120 may delay the received clock signal CLK for a certain time and output the delayed clock signal CLK'.

The delayed clock signal CLK' is supplied to the phase controller 130 and the data storage 140.

The phase controller 130 corrects the phase difference data of each data receiver 110 by sequentially selecting the plurality of data receivers 110-1 to 110-4.

Specifically, the phase controller 130 selects any one of the plurality of data receivers 110-1 to 110-4 and compares the phases of data signals DATA1' to DATA4' output from the selected data receiver with the phase of a clock signal CLK' output from the clock receiver 120.

In a case where the comparison result reveals the existence of a skew, the phase controller 130 outputs, to the selected receiver, a phase control signal PCS for correcting a phase data of the selected data receiver according to the phase difference between the data signals DATA1' to DATA4' and the clock signal CLK' output from the clock receiver 120.

In this specification, a skew is said to occur when the phase difference between data and clock signals does not correspond to the regulated value of an interface. For example, in the MIPI®, the phase difference between data and clock signals should be 90 degrees. In this example, the skew occurs when the phase difference between data and clock signals is not 90 degrees.

However, when no skew occurs, the phase controller 130 sequentially selects another of the plurality of data receivers 110-1 to 110-4 and, if a skew exists, corrects a phase difference data of the selected data receiver.

For example, the phase controller 130 selects the first data receiver 110-1 and compares the phase of a first data signal DATA1' output from the first data receiver 110-1 with the phase of a clock signal CLK'.

When the comparison result reveals a skew, the phase controller 130 outputs a phase control signal PCS to the first data receiver 110-1 according to the phase difference between the first data signal DATA1' and the clock signal CLK'.

In this case, the first data receiver 110-1 corrects a phase data in response to the phase control signal PCS output from the phase controller 130. Then, the first data receiver 110-1 delays a first data signal DATA1 supplied through the first data line according to the corrected phase difference data and outputs the delayed first data signal DATA1'.

The phase controller 130 re-compares the phase of the first data signal DATA1' output from the first data receiver 110-1 with the phase of the clock signal CLK'.

When the comparison result continuously reveals a skew, the phase controller 130 outputs a phase control signal PCS to the first data receiver 110-1 according to the phase difference between the first data signal DATA1' and the clock signal CLK'.

However, when no skew occurs, the phase controller 130 finishes the process for the first data receiver 110-1, and selects another of the plurality of data receivers 110-1 to 110-4.

In other words, the phase controller 130 controls the plurality of data receivers 110-1 to 110-4 by sequentially selecting the plurality of data receivers 110-1 to 110-4 so that the phase difference between the data signals DATA1' to DATA4' and the clock signal CLK' corresponds to the regulation of the interface.

The phase controller 130 includes a multiplexer 131, a phase control circuit 133 and a plurality of switches SW1 to SW4.

In one embodiment, the multiplexer 131 outputs one of data signals DATA1' and DATA2', i.e., a data signal output from the selected data receiver, in response to a selection signal SS.

In an embodiment, the selection signal SS is output from the phase control circuit 132. That is, the phase control circuit 132 may control the multiplexer 131.

The phase control circuit 132 compares the phase of the data signal output from the multiplexer 131 with the phase of the clock signal CLK' output from the clock receiver 130, and outputs a phase control signal PCS as the compared result.

The plurality of switches SW1 to SW4 couples the selected data receiver and the phase control circuit 132 to each other. That is, only one of the plurality of switches SW1 to SW4, corresponding to the selected data receiver, is turned on, and the other switches are turned off.

Accordingly, the phase control signal PCS output from the phase control circuit 132 is transmitted to only the selected data receiver.

In an embodiment, the plurality of switches SW1 to SW4 are controlled by the phase control circuit 132.

In other words, the phase control circuit 133 selects any one of the plurality of data receivers 110-1 to 110-4, using the multiplexer 131 and the plurality of switches SW1 to SW4, and corrects the phase difference data of the selected data receiver.

The data storage 140 stores the data signals DATA1' to DATA4', respectively output from the plurality of data receivers 110-1 to 110-4, in response to the clock signal CLK' output from the clock receiver 120.

The data storage 140 includes a plurality of flip-flop groups 141-1 to 141-4.

Each of the plurality of flip-flop groups 141-1 to 141-4 stores a data signal output from a corresponding data receiver among the plurality of data receivers 110-1 to 110-4, in response to the clock signal CLK' output from the clock receiver 120.

The phase controller 130 may reduce or remove a skew by compensating for the phase difference between the data signals DATA1 to DATA4 and the clock signal CLK when a semiconductor device including the skew compensation apparatus 100 produced (e.g. prior to being used in a consumer application).

However, it may be impossible to reduce or remove a skew occurring as a result of a change in external environment, such as temperature, through only the initial compensation. Therefore, the phase controller 130 may additionally reduce or remove a skew, using a blank section between data packets during the operation of the semiconductor device.

FIG. 4 is a timing diagram illustrating an operation of the skew compensation apparatus shown in FIG. 1, according to an example embodiment of the present invention.

Referring to FIG. 4, the skew compensation apparatus 100 compensates for the phase difference between the data signals DATA1 to DATA4 and the clock signal CLK, using a blank section in which no data packet is supplied from the outside, i.e., a blank section, referred to as "Blank", between data packets.

Specifically, the phase controller 130 corrects the phase difference data of each of the plurality of data receivers 110-1 to 110-4, using a null packet supplied through data lines during the blank section Blank.

In an embodiment, the data signals DATA1 to DATA4, respectively supplied to the plurality of data receivers 110-1 to 110-4, are configured with data packets and a blank section Blank between the data packets. The phase controller 130 may output, to the selected data receiver, a phase control signal PCS, generated based on the phase difference between the null packet supplied during the blank section Blank and the clock signal CLK.

When the data packet is supplied through the data lines after the blank section Blank, each of the plurality of data receivers 110-1 to 110-4 delays a data signal supplied through a corresponding data line according to each phase difference data, and outputs the delayed data signal.

The skew compensation apparatus 100 reduces or removes a skew, using the null packet supplied during the blank section Blank, thereby reducing power consumption.

In this description, it has been assumed that the skew compensation apparatus 100 is operated according to the specification of the MIPI®. However, the technical spirit of the present invention is not limited thereto. That is, the skew compensation apparatus 100, according to this embodiment, may be applied to all interfaces including the MIPI®, which perform communications (e.g. processor communications), using the phase difference between data and clock signals.

By way of summation and review, according to the specification of the MIPI®, a transmitter transmits data and clock signals to have a phase difference (e.g., a regulated or predetermined phase difference), such as a phase difference of 90 degrees, and a receiver receives the data and clock signals according to the phase difference (or regulated or predetermined phase difference). The interface including the MIPI®, which uses a phase difference between data and clock signals, does not require handshaking or training between the transmitter and the receiver. Thus, the interface is advantageous in high-speed data transmission.

However, the phase difference between the data and clock signals received by the receiver may be changed due to an external factor, e.g., temperature, voltage, processing condition, etc. In this case, an error such as data loss may occur in the receiver.

An embodiment of the present invention relates to an apparatus for compensating for a skew between data signals supplied through a plurality of data lines and a clock signal supplied through a clock line.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various suitable changes in form and details may be made without departing from the spirit and scope of the present invention as set forth in the following claims, and equivalents thereof.

What is claimed is:

1. A skew compensation apparatus, comprising:
    a plurality of data receivers each configured to delay a data signal supplied through a corresponding data line based on associated phase difference data and to output a delayed data signal of a plurality of delayed data signals;
    a clock receiver configured to receive a clock signal supplied through a clock line; and
    a phase controller configured to select one of the plurality of data receivers and to output, to the selected data receiver, a phase control signal configured to correct phase difference data of the selected data receiver based on a phase difference between a corresponding delayed data signal output from the selected data receiver and the clock signal, the phase controller comprising a multiplexer configured to output the corresponding delayed data signal output from the selected data receiver, the corresponding delayed data signal being selected from among the plurality of delayed data signals output from the plurality of data receivers.

2. The skew compensation apparatus of claim 1, wherein the phase controller is configured to correct corresponding phase difference data of each of the plurality of data receivers by sequentially selecting the plurality of data receivers.

3. The skew compensation apparatus of claim 1, wherein each of the plurality of data receivers comprises:
    a finite state machine configured to correct and store the phase difference data in response to the phase control signal; and
    a delay circuit configured to delay the data signal supplied through the corresponding data line, based on the phase difference data stored in the finite state machine, and to output the delayed data signal.

4. The skew compensation apparatus of claim 1, wherein the clock receiver is configured to delay the clock signal supplied through the clock line for a certain time and to output a delayed clock signal.

5. The skew compensation apparatus of claim 1, wherein the phase controller is configured to output the phase control signal so that the phase difference between a clock signal output from the clock receiver and the corresponding delayed data signal output from the selected data receiver becomes 90 degrees.

6. A skew compensation apparatus, comprising:
a plurality of data receivers each configured to delay a data signal supplied through a corresponding data line based on associated phase difference data and to output a delayed data signal of a plurality of delayed data signals;
a clock receiver configured to receive a clock signal supplied through a clock line; and
a phase controller configured to select one of the plurality of data receivers and to output, to the selected data receiver, a phase control signal configured to correct phase difference data of the selected data receiver based on a phase difference between a corresponding delayed data signal output from the selected data receiver and the clock signal,
wherein the phase controller comprises:
a multiplexer configured to output the corresponding delayed data signal output from the selected data receiver, selected from among the plurality of delayed data signals output from the plurality of data receivers, in response to a selection signal;
a phase control circuit configured to output the phase control signal based on the phase difference between the clock signal and the corresponding delayed data signal output from the multiplexer; and
a plurality of switches configured to couple the phase control circuit to the selected data receiver.

7. The skew compensation apparatus of claim 6, wherein the selection signal is output from the phase control circuit.

8. The skew compensation apparatus of claim 6, wherein the plurality of switches are controlled by the phase control circuit.

9. The skew compensation apparatus of claim 1, further comprising a data storage configured to store the plurality of delayed data signals output from the plurality of data receivers in response to the clock signal.

10. The skew compensation apparatus of claim 9, wherein the data storage comprises a plurality of flip-flop groups each configured to store one of the plurality of delayed data signals output from the plurality of data receivers in response to the clock signal.

11. The skew compensation apparatus of claim 1, wherein data signals supplied to the plurality of data receivers are configured with data packets and a blank section between the data packets.

12. A skew compensation apparatus, comprising:
a plurality of data receivers each configured to delay a data signal supplied through a corresponding data line based on associated phase difference data and to output the delayed data signal;
a clock receiver configured to receive a clock signal supplied through a clock line; and
a phase controller configured to select one of the plurality of data receivers and to output, to the selected data receiver, a phase control signal configured to correct phase difference data of the selected data receiver based on a phase difference between a corresponding data signal output from the selected data receiver and the clock signal,
wherein data signals supplied to the plurality of data receivers are configured with data packets and a blank section between the data packets, and
wherein the phase controller is configured to output, to the selected data receiver, the phase control signal generated based on the phase difference between a null packet supplied during the blank section and the clock signal.

* * * * *